United States Patent
Kim et al.

(10) Patent No.: US 12,518,327 B2
(45) Date of Patent: Jan. 6, 2026

(54) WATER AND WASTEWATER TREATMENT PROCESS OPTIMIZATION AND AUTOMATIC DESIGN SYSTEM, AND DESIGN METHOD USING SAME

(71) Applicant: BKT CO., LTD., Daejeon (KR)

(72) Inventors: Dong Woo Kim, Yoba Linda, CA (US); Min Seok Park, Sejong-si (KR); Seung Ho Lee, Daejeon (KR)

(73) Assignee: BKT CO., LTD., Daejeon (KR)

( * ) Notice: Subject to any disclaimer, the term of this patent is extended or adjusted under 35 U.S.C. 154(b) by 443 days.

(21) Appl. No.: 17/775,938

(22) PCT Filed: Nov. 16, 2020

(86) PCT No.: PCT/KR2020/016078
§ 371 (c)(1),
(2) Date: May 11, 2022

(87) PCT Pub. No.: WO2021/101190
PCT Pub. Date: May 27, 2021

(65) Prior Publication Data
US 2022/0414802 A1    Dec. 29, 2022

(30) Foreign Application Priority Data

Nov. 19, 2019  (KR) .................. 10-2019-0148187

(51) Int. Cl.
*G06Q 50/08*    (2012.01)
*G06F 30/18*    (2020.01)
(Continued)

(52) U.S. Cl.
CPC ............ *G06Q 50/08* (2013.01); *G06F 30/18* (2020.01); *G06F 30/20* (2020.01); *G06Q 10/06313* (2013.01)

(58) Field of Classification Search
CPC .. G06Q 50/08; G06Q 50/06; G06Q 10/06313; G06F 30/20; G06F 30/18
(Continued)

(56) References Cited

U.S. PATENT DOCUMENTS 8,428,753 B2    4/2013   Gauder et al.
12,106,021 B2   10/2024  Linehan et al.

FOREIGN PATENT DOCUMENTS

CN    102087506 A    6/2011
CN    103061398 A    4/2013
(Continued)

OTHER PUBLICATIONS

Takahashi et al, English machine translation JP 2017170274A, pp. 1-9 (Year: 2017).*

(Continued)

*Primary Examiner* — Claire A Norris
(74) *Attorney, Agent, or Firm* — Panitch Schwarze Belisario & Nadel LLP (57) ABSTRACT

A water and wastewater treatment process optimization and automatic design system and a design method using the same of the present invention can optimize water and wastewater treatment processes for design of a water and wastewater treatment device that includes a plurality of treatment processes and can automatically generate design deliverables such as drawings, bills of quantities, etc., for design of an optimal process configuration.

2 Claims, 4 Drawing Sheets

(51) Int. Cl.
  *G06F 30/20* (2020.01)
  *G06Q 10/0631* (2023.01)
(58) Field of Classification Search
  USPC .......................................... 705/400; 210/739
  See application file for complete search history.

(56) References Cited

FOREIGN PATENT DOCUMENTS

| | | | |
|---|---|---|---|
| CN | 109305739 A | | 2/2019 |
| EP | 3 115 941 | | 1/2017 |
| JP | 2008126110 A | | 6/2008 |
| JP | 2017170274 A | * | 9/2017 |
| JP | 2018075539 A | * | 5/2018 |
| KR | 1020000049958 A | | 8/2000 |
| KR | 20110023608 | | 3/2011 |
| KR | 1020110023608 A | | 3/2011 |
| KR | 20130112098 A | | 10/2013 |
| KR | 1020140117959 A | | 10/2014 |
| WO | WO 2019/071384 | | 4/2019 |

OTHER PUBLICATIONS

Horii, English machine translation JP 2018075539A, pp. 1-6 (Year: 2018).*
Office Action and Search Report issued Jun. 29, 2025 in CN Application No. 202080079760.X, and English translation of the Office Action.

* cited by examiner

ID
WATER AND WASTEWATER TREATMENT PROCESS OPTIMIZATION AND AUTOMATIC DESIGN SYSTEM, AND DESIGN METHOD USING SAME

TECHNICAL FIELD

The present invention relates to water and wastewater treatment process design, and more particularly, to a water and wastewater treatment process optimization and automatic design system and a design method using the same capable of optimizing water and wastewater treatment processes for a water and wastewater treatment device that includes a plurality of treatment processes and automatically designing an optimized water and wastewater treatment process.

BACKGROUND ART

In South Korea, due to environmental pollution, population growth, and improvement in living standards caused by advanced industrial development after the 1950s, pollutant emissions have increased, causing water pollution to intensify day by day.

In particular, there is a problem in that an increasing number of rivers adjacent to water source protection areas, rural rivers that receive non-point pollutants such as livestock wastewater and fertilizers, and urban rivers that receive domestic and industrial wastewater are losing their value as water resources locally due to water pollution.

Such pollution of small and medium-sized rivers or upstream tributaries in urban areas is directly connected to pollution of large rivers. Moreover, it is considered very serious because if the pollution condition continues in the rivers around our homes, direct and indirect damage such as sanitary problems including odors, fish death, and underground wastewater contamination may occur.

In recent years, water sources, rivers, and groundwater have been increasingly polluted due to population growth, industrialization, and urbanization, and securing the safety of drinking water has become very critical. Thus, research on water purification or water and wastewater treatment devices for drinking water to meet clean and safe drinking water has been actively conducted.

Existing water and wastewater treatment devices remove pollutants by complex internal mechanisms and are non-linear.

Therefore, depending on the water and wastewater treatment plant, it is common to design a water and wastewater treatment device according to information on a project specification for water purification or wastewater and wastewater treatment, basic information of a target device for water purification or wastewater water treatment according to the presence/absence of disinfection facilities, process sequencing, coagulant injection, etc., information on wastewater flowing into the device for water purification or wastewater and wastewater treatment, information on the target water quality of the device for water purification or wastewater treatment, and the like.

In the way, construction of a water and wastewater treatment device is carried out according to a design proposal including treatment mass balance, treatment design calculation, design drawings, construction cost details, etc., based on predetermined design conditions as described above.

Here, the treatment mass balance, treatment design calculation, design drawings, construction cost details, etc. included in the design proposal for the design of the water and wastewater treatment device are each generated using separate software instead of all of them being generated using single software, and the generated information is entered using a manual method.

However, as described above, since the optimal process design proposal for the water and wastewater treatment device uses the manual method, there is a problem in that a large amount of time is required to prepare the design proposal.

In particular, the design proposal should be completed in a short time with limited manpower.

In the process of preparing the design proposal, frequent iterative revisions are made to the design proposal due to delays in design changes, mass balance/drawing review, preparation guidelines, and Q&A. Thus, there is a problem in that the work time and cost required to prepare the design proposal increase.

Accordingly, the present applicant has proposed the present invention in order to address the above problems, and the related art of the present invention includes Korean Patent Registration No. 10-1690211 (Title of Invention: BIM-based construction value engineering (VE) processing system, Date of Registration: Dec. 21, 2016).

DISCLOSURE

Technical Problem

The present invention is directed to providing a water and wastewater treatment process optimization and automatic design system and a design method using the same capable of optimizing water and wastewater treatment processes for a water and wastewater treatment device that includes a plurality of treatment processes and automatically designing an optimized water and wastewater treatment process.

The present invention is also directed to providing a water and wastewater treatment process optimization and automatic design system and a design method using the same capable of combining a plurality of treatment modules to design a process configuration that matches target water quality and treatment capacity.

The objectives of the present invention are not limited to those mentioned above, and other unmentioned objectives should be clearly understood by those of ordinary skill in the art from the description below.

Technical Solution

The above objectives can be achieved by a water and wastewater treatment process optimization and automatic design system according to the present invention in which a plurality of treatment processes are combined to perform water and wastewater treatment to meet target water quality and which includes a plurality of treatment modules that match functions of separate treatment processes, the water and wastewater treatment process optimization and automatic design system, which is an optimal process design automation system of a water and wastewater treatment device, including a water and wastewater treatment process simulation part which is configured to derive one or more process configurations in which the plurality of treatment modules are combined according to basic design information including a treatment capacity and design water quality of the water and wastewater treatment device and perform simulation to generate mass balance and a design calculation based on the derived process configurations, a construction cost calculating part which is configured to calculate a construction cost according to the design calculation, and an outputting part which is configured to output projected effluent water quality and the construction cost for each process configuration.

Also, the water and wastewater treatment process optimization and automatic design system may further include a drawing generating part which is configured to generate design drawings of the treatment modules according to each process configuration based on the mass balance and the design calculation.

In the water and wastewater treatment process optimization and automatic design system, the construction cost calculating part may calculate the construction cost on the basis of the design drawings.

In the water and wastewater treatment process optimization and automatic design system, the outputting part may be provided to output the design calculation, the projected effluent water quality, and the construction cost for a process configuration that satisfies the target water quality.

Meanwhile, in the water and wastewater treatment process optimization and automatic design system, the outputting part may also be provided to output a plurality of process configurations and output the design calculation, the projected effluent water quality, and the construction cost for each of the output process configurations.

Also, the water and wastewater treatment process optimization and automatic design system may further include a proposal generating part which is configured to generate a design proposal including at least one of the design calculation, the design drawings, the projected effluent water quality, and the construction cost.

In the water and wastewater treatment process optimization and automatic design system, the water and wastewater treatment process simulation part may store the plurality of process configurations according to combinations of the plurality of treatment modules, and the optimal process design automation system of the water and wastewater treatment device may further include a process drawing part which is configured to derive one or more process configurations suitable for basic design information among the stored plurality of process configurations.

In the water and wastewater treatment process optimization and automatic design system, the water and wastewater treatment process simulation part may generate structure dimensions for each treatment module of the derived process configurations according to detailed design information, and the detailed design information may include at least one piece of information among detailed information of wastewater flowing in and major design factors, residence time, and target water quality that correspond to the derived process.

Meanwhile, the water and wastewater treatment process simulation part may perform simulation with not only the basic design information from the generated structure dimensions to review the stability of the derived process configurations, but also the information including at least one of a change in a water temperature condition, a change in a concentration condition of the wastewater flowing in, and a daily/weekday/weekend or seasonal/annual change in a wastewater inflow condition.

Meanwhile, the water and wastewater treatment process optimization and automatic design system may further include a data storaging part configured to store information for optimal process design of the water and wastewater treatment device, and the data storaging part linked to at least one of the process drawing part, the water and wastewater treatment process simulation part, the drawing generating part, the construction cost calculating part, the outputting part, and the proposal generating part.

Meanwhile, according to another aspect of the present invention, the above objectives can be achieved by a design method using a water and wastewater treatment process optimization and automatic design system in which a plurality of treatment processes are combined to perform water and wastewater treatment to meet target water quality and which includes a plurality of treatment modules that match functions of separate treatment processes, the design method including an operation of deriving one or more process configurations in which the plurality of treatment modules are combined according to basic design information including a treatment capacity and design water quality of a water and wastewater treatment device and performing simulation to generate mass balance and a design calculation based on the derived process configurations, an operation of calculating a construction cost according to the design calculation, and an operation of outputting projected effluent water quality and the construction cost for each process configuration.

The design method may further include, prior to the simulation performing operation, an operation of deriving one or more process configurations and structure dimensions suitable for the basic design information.

The design method may further include, after the process configuration and structure dimension deriving operation, a drawing generating operation for generating design drawings of the treatment modules according to the process configurations based on the mass balance and the design calculation generated in the simulation performing operation.

The design method may further include, after the projected effluent water quality and construction cost outputting operation, an operation of generating a design proposal including at least one of the design drawings, the design calculation, the projected effluent water quality, and the construction cost.

In the design method, the target water quality and construction cost outputting operation may include repeatedly performing a water and wastewater treatment process simulation performing operation for revising the process configuration according to detailed design information using an analytics/learning technique in a case where the process configuration is determined as not satisfying the target water quality.

Advantageous Effects

A water and wastewater treatment process optimization and automatic design system and a design method using the same of the present invention have effects of allowing optimization of water and wastewater treatment processes for design of a water and wastewater treatment device that includes a plurality of treatment processes and allowing automatic production of design deliverables such as drawings, bills of quantities, etc., for design of an optimal process configuration. Further, it is possible to significantly reduce the time and manpower required to design the optimal process of the water and wastewater treatment device and significantly reduce human error in the design deliverables.

Also, the water and wastewater treatment process optimization and automatic design system and the design method using the same of the present invention allow design of an optimal process configuration in which a plurality of treatment modules, which satisfy target water quality and treatment capacity for the water and wastewater treatment device, are combined.

In addition, the water and wastewater treatment process optimization and automatic design system and the design method using the same of the present invention allow, even when detailed design information is changed, an optimal process configuration matching the changed detailed design information to be promptly selected using a water and wastewater treatment process simulation part, a process drawing part, a drawing generating part, a construction cost calculating part, an outputting part, and a proposal generating part.

MODES OF THE INVENTION

Hereinafter, embodiments of the present invention will be described in detail with reference to the accompanying drawings to allow those of ordinary skill in the art to which the present invention pertains to easily carry out the embodiments. The present invention may be implemented in various different forms and is not limited to the embodiments described herein.

Note that the drawings are schematic and not drawn to scale. Relative sizes and ratios of parts illustrated in the drawings have been exaggerated or reduced in size for clarity and convenience of the description with reference to the drawings, and arbitrary sizes are only illustrative and not limiting. In addition, the same reference numerals are used to denote the same structure, element, or part shown in two or more drawings to indicate similar features.

The embodiments of the present invention specifically show ideal embodiments of the present invention. As a result, various modifications of the drawings are expected. Therefore, the embodiments are not limited to specific shapes illustrated in the drawings and, for example, may also include modifications to the shapes formed by manufacturing.

Hereinafter, a water and wastewater treatment process optimization and automatic design system 10 and a design method S100 using the same according to an embodiment of the present invention will be described with reference to the accompanying drawings.

First, the water and wastewater treatment process optimization and automatic design system 10 (hereinafter referred to as "automatic design system") will be described referring to FIGS. 1 and 2.

Figure 1:
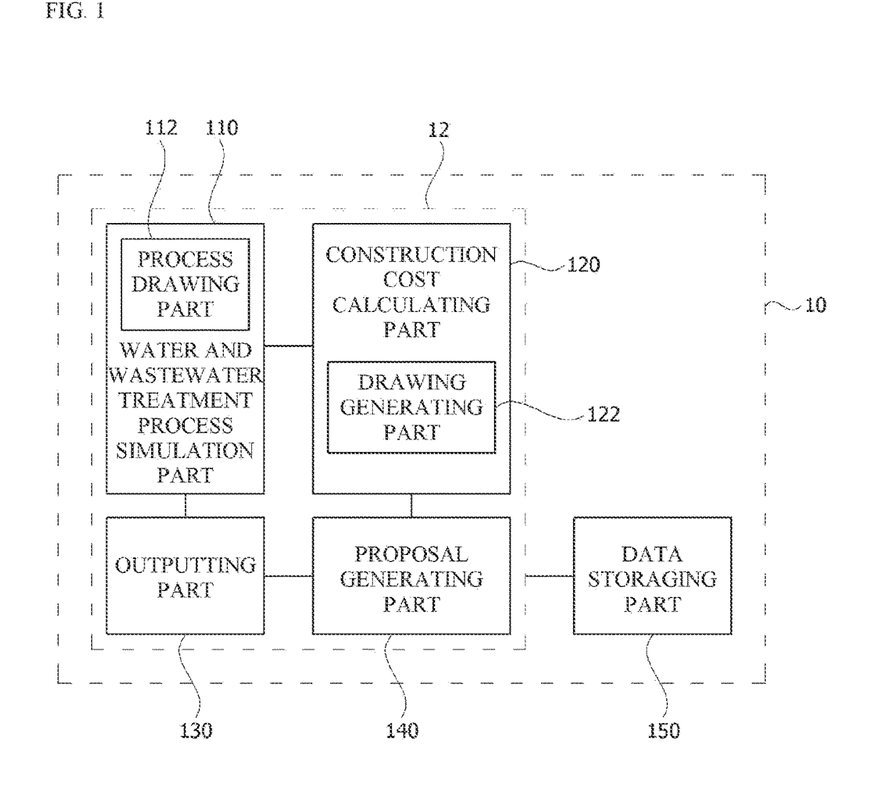
FIG. 1 is a block diagram illustrating a water and wastewater treatment process optimization and automatic design system according to an embodiment of the present invention.
Figure 2:
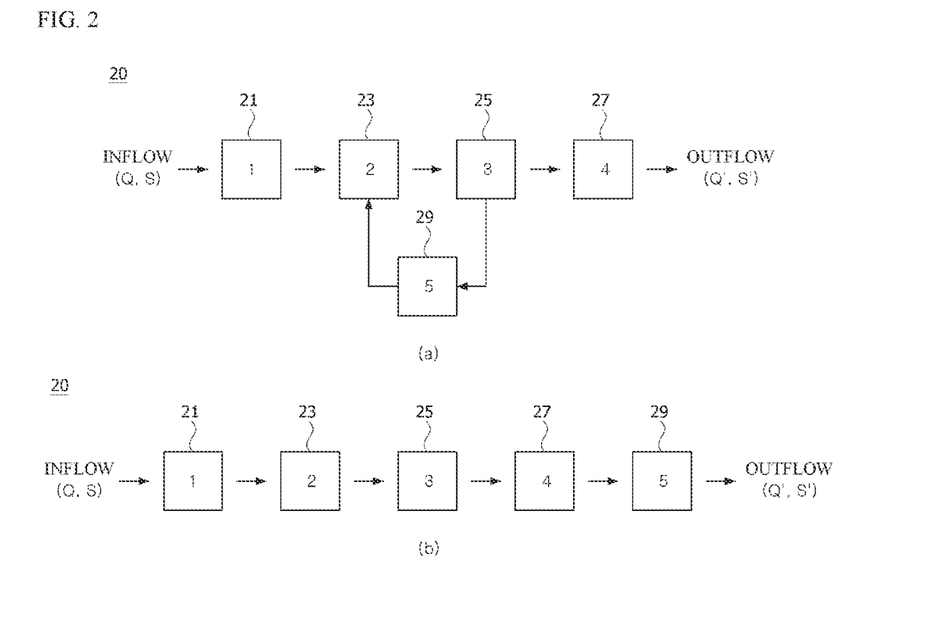
FIG. 2 is a view illustrating an example of an optimal process configuration derived by the water and wastewater treatment process optimization and automatic design system illustrated in FIG. 1.

As illustrated in FIG. 1, the automatic design system 10 according to an embodiment of the present invention includes a water and wastewater treatment process simulation part 110, a construction cost calculating part 120, and an outputting part 130.

First, the automatic design system 10 according to an embodiment of the present invention is for designing a process configuration 20 of a water and wastewater treatment device that matches a daily treatment capacity and target water quality.

Generally, the water and wastewater treatment device includes a plurality of treatment processes to treat wastewater.

For example, the water and wastewater treatment device may include a combination of a plurality of treatment processes such as a pretreatment facility process, a main treatment facility process, a tertiary treatment facility process, a disinfection facility process, and an additional facility process. Here, a treatment module corresponding to each treatment process is included to perform each treatment process, and a single process configuration 20 is derived by a combination of a plurality of treatment modules.

The water and wastewater treatment process simulation part 110 derives one or more process configurations 20 by the combination of the plurality of treatment modules according to basic design information including the daily treatment capacity to be achieved and the target water quality.

Also, the water and wastewater treatment process simulation part 110 generates mass balance and a design calculation based on the derived process configurations 20 and performs simulation to produce projected effluent water quality (output) according to the design calculation.

Here, the amount of water flowing into the water and wastewater treatment device is referred to as a capacity.

Also, the design calculation refers to a type of bill for calculating what type of process configuration 20 should be configured for a treatment process for treating the capacity flowing into the water and wastewater treatment device.

As illustrated in FIGS. 2A and 2B, the process configuration 20 of the water and wastewater treatment device may include a first treatment module 21 configured to perform the pretreatment facility process and a second treatment module 23 configured to perform the main treatment facility process.

Also, the process configuration 20 of the water and wastewater treatment device may include a third treatment module 25 configured to perform the tertiary treatment facility process, a fourth treatment module 27 configured to perform the disinfection facility process, and a fifth treatment module 29 configured to perform the additional facility process.

As illustrated in FIG. 2A, the process configuration 20 of the water and wastewater treatment device has the first treatment module 21, the second treatment module 23, the third treatment module 25, and the fourth treatment module 27 disposed in this order.

In addition, the process configuration 20 of the water and wastewater treatment device may also be designed to operate the fifth treatment module 29 according to a treatment result of the third treatment module 25.

As illustrated in FIG. 2B, the process configuration 20 of the water and wastewater treatment device may also be designed to operate the first treatment module 21, the second treatment module 23, the third treatment module 25, the fourth treatment module 27, and the fifth treatment module 29 in this order.

For reference, FIGS. 2A and 2B each illustrate an example of the process configuration 20 of the water and wastewater treatment device, and the present invention is not necessarily limited thereto.

In the process configuration 20 derived as in FIGS. 2A and 2B, a treatment capacity Q' and a projected effluent water quality S' being generated may vary according to an inflow capacity Q and a target water quality S being input.

The process configuration 20 may also be redesigned by adjusting the treatment capacity Q' and the projected effluent water quality S'. Here, economic feasibility may be reviewed according to the treatment capacity Q' and the projected effluent water quality S' generated by the process configuration 20, and the process configuration 20 may be redesigned depending on the result.

The process configuration 20 of the water and wastewater treatment device is derived by repeatedly performing the above process, and an optimal treatment process according to the derived process configuration 20 is selected.

To this end, a plurality of process configurations 20 according to combinations of the plurality of treatment modules 21, 23, 25, 27, and 29 are stored in the water and wastewater treatment process simulation part 110.

Also, the water and wastewater treatment process simulation part 110 generates structure dimensions for each treatment module constituting the process configurations 20 according to detailed design information.

Here, the detailed design information input to the water and wastewater treatment process simulation part 110 may include at least one piece of information among detailed information of wastewater flowing in and major design factors, residence time, and target water quality that correspond to the generated process configuration 20.

The detailed information of the wastewater flowing in that is input to the detailed design information refers to information related to detailed properties of wastewater for accurate simulation in the water and wastewater treatment process simulation part 110.

For reference, the information related to the properties of wastewater may be directly input by a designer of the water and wastewater treatment device, or database analysis data or information stored in a data storaging part which will be described below may be utilized as the information related to the properties of wastewater.

Also, the major design factors input to the detailed design information refer to information related to design factors that are related to a determined optimal process configuration.

Here, detailed structure dimensions generated from the major design factors input to the detailed design information may be automatically generated using the structure dimensions that take the residence time and target water quality into consideration.

Meanwhile, the automatic design system 10 includes a process drawing part 112 configured to derive the plurality of process configurations 20 stored in the water and wastewater treatment process simulation part 110.

The process drawing part 112 derives one or more process configurations 20 suitable for basic design information among the plurality of process configurations 20 stored in the water and wastewater treatment process simulation part 110.

Here, the basic design information input to derive a suitable process configuration 20 through the process drawing part 112 may include contents relating to information on a project to be designed, basic information of the water and wastewater treatment device, information on the wastewater flowing into the water and wastewater treatment device, and information on the target water quality.

For example, the project information may be project information of a water and wastewater treatment device that includes the project name, region (country), client information of a water and wastewater treatment device to be designed.

Also, the basic information of the water and wastewater treatment device may be information on the presence/absence of disinfection facilities and a preferred disinfection process, the presence/absence of process sequencing and the number of sequences, and whether a coagulant is injected and a preferred coagulant.

Also, the information on the wastewater flowing into the water and wastewater treatment device may be information on the properties of wastewater flowing in or default values for each country, Chemical Oxygen Demand (COD), Biochemical Oxygen Demand (BOD), Total Suspend Soiled (TSS), Total Nitrogen (TN), Total Phosphorus (TP), ammonia nitrogen ($NH_3N$), reference water temperatures (average, maximum, minimum), an average daily amount of wastewater, an amount of wastewater per unit time, and an hourly maximum amount of wastewater.

Here, the information on the target water quality may be target water quality according to national regulatory water quality guidelines.

Here, selecting a suitable process Configuration 20 among the process configurations 20 derived in the water and wastewater treatment process simulation part 110 may be performed by the designer designing the water and wastewater treatment device. For reference, selecting a suitable process configuration 20 from the water and wastewater treatment process simulation part 110 may be performed using a system or program such as a separately-provided computer.

For example, in a case where the designer gets involved in selecting a process configuration 20 suitable for each treatment process, the one or more process configurations 20 derived by the process drawing part 112 may be compared/listed to select a suitable process configuration 20.

The judgement conditions compared or listed to select the process configuration 20 may include the water quality, construction cost, required area, maintenance and administration fee, etc. for each process configuration 20.

Conversely, in a case where the designer does not get involved in selecting a process configuration 20 suitable for each treatment process, a suitable process configuration 20 may be selected through major design factors by an update through an average design constant value for each process configuration 20, a basic process configuration 20, or acquisition/analysis of field data.

Meanwhile, the water and wastewater treatment process simulation part 110 performs dynamic simulation according to the judgement conditions and, as a result thereof, outputs the final mass balance and design calculation.

Here, the water and wastewater treatment process simulation part 110 may also perform simulation in consideration of judgement conditions other than the basic design information on the basis of the generated structure dimensions to review the stability of the derived process configurations 20.

Here, when reviewing the stability of the derived process configurations 20 using the water and wastewater treatment process simulation part 110, simulation is performed in consideration of judgement conditions such as changes in amounts such as high concentration, low concentration, low water temperature, low flow rate, and high flow rate, other than the basic design information.

For example, the judgement conditions input to the water and wastewater treatment process simulation part 110 may include a change in a water temperature condition which is for judging whether the target water quality is satisfied when a water temperature changes in winter and summer and a change in a concentration condition of the wastewater flowing in which is for judging whether the target water quality is satisfied when the wastewater flows in with a high concentration and a low concentration.

Also, the judgement conditions input to the water and wastewater treatment process simulation part 110 may include a change in a flow rate condition of the wastewater flowing in which is for judging whether the target water quality is satisfied when the wastewater flows in with a high flow rate and a low flow rate and may include whether the target water quality is satisfied according to water quality pattern analysis when a daily/weekday/weekend change occurs in the inflow conditions (flow rate, concentration) and water quality pattern analysis when a seasonal/annual change occurs in the inflow conditions (flow rate, concentration, water temperature).

That is, the judgement conditions input to the water and wastewater treatment process simulation part 110 may include at least one of the conditions listed above.

Meanwhile, design drawings according to the process configurations 20 are generated on the basis of the design calculation generated through the water and wastewater treatment process simulation part 110. In other words, the design drawings generated using the water and wastewater treatment process simulation part 110 relate to the treatment module according to each process configuration 20 and are generated by a drawing generating part 122.

Here, the design drawings generated by the drawing generating part 122 may be a facility layout plan, a treatment system diagram, an equipment list table, a piping & instrumentation diagram (P&ID), a machine layout diagram, a general structure diagram, a monitoring and control system configuration diagram, a switchboard wiring diagram, an information flow diagram (IFD), an electromotive device accompanying diagram, a repair system diagram, and the like, but are not necessarily limited thereto.

Here, the drawing generating part 122 generates a primary product.

Then, the drawing generating part 122 generates a secondary product based on the generated primary product, and thus it is possible to prevent a design error for the water and wastewater treatment device that may occur in the related art.

For reference, detailed values of the design drawings generated by the drawing generating part 122 are generated on the basis of the derived process configurations 20.

Meanwhile, the construction cost may be calculated according to the design calculation generated through the water and wastewater treatment process simulation part 110.

Here, the calculated construction cost is calculated on the basis of the design drawings generated by the drawing generating part 122 and is generated by the construction cost calculating part 120.

The construction cost generated by the construction cost calculating part 120 may be about a repair bill, the construction cost & maintenance and administration fee, a civil construction cost, a mechanical construction cost, an electricity/measurement construction cost, a test operation cost, a building construction cost, calculation of the annual maintenance and administration fee, the total Life Cycle Cost (LCC), and the like.

Also, the projected effluent water quality and construction cost may be output for each of the derived process configurations 20.

Here, the projected effluent water quality and construction cost that correspond to each process configuration 20 are output by the outputting part 130.

In particular, the outputting part 130 is provided to output the design calculation, projected effluent water quality, and construction cost for the entire process configurations 20 that meets the target water quality.

Also, the outputting part 130 may also be provided to output the plurality of process configurations 20 and output the design calculation, projected effluent water quality, and construction cost for each process configuration 20.

Meanwhile, in a case where the process configuration 20 is determined as not satisfying the target water quality in the outputting part 130, one or more process configurations 20 are derived again according to the basic design information through the water and wastewater treatment process simulation part 110. Then, the water and wastewater treatment process simulation part 110 generated the design calculation according to the derived process configurations 20 and the projected effluent water quality according to the design calculation again.

Here, the outputting part 130 allows simulation to be performed again through the water and wastewater treatment process simulation part 110 using an analytics/learning technique.

In this way, at least one condition among the target water quality, structure dimensions, device dimensions, and process configurations 20 may also be adjusted.

Meanwhile, the automatic design system 10 according to an embodiment of the present invention further includes a proposal generating part 140.

The proposal generating part 140 is for generating a design proposal for process design of the water and wastewater treatment device. In other words, the proposal generating part 140 generates a design proposal including at least one of the design calculation generated by the water and wastewater treatment process simulation part 110, the design drawings generated by the drawing generating part 122, and the construction cost output by the outputting part 130.

Also, the automatic design system 10 according to an embodiment of the present invention further includes a data storaging part 150.

The data storaging part 150 may store information for the process design of the water and wastewater treatment device in the form of big data or cloud.

In particular, the data storaging part 150 may be linked to at least one of the process drawing part 112, the water and wastewater treatment process simulation part 110, the drawing generating part 122, the construction cost calculating part 120, the outputting part 130, and the proposal generating part 140.

Accordingly, information necessary for each part may be provided at the right moment through the data storaging part 150.

Here, the data storaging part 150 may store one or more process configurations 20 derived to be suitable for the basic design information by the process drawing part 112.

Also, the data storaging part 150 may store one or more process configurations 20 according to combinations of the plurality of treatment modules generated by the water and wastewater treatment process simulation part 110 and the projected effluent water quality according to the mass balance and design calculation based on the process configurations 20.

Also, the data storaging part 150 may store the design drawings for the process configurations 20 generated by the drawing generating part 122 and the construction cost calculated by the construction cost calculating part 120.

Also, the data storaging part 150 may include the projected effluent water quality and construction cost output for each process configuration 20 by the outputting part 130. Also, the data storaging part 150 may store the design proposal including the design calculation, design drawings, projected effluent water quality, or construction cost generated by the proposal generating part 140.

For reference, the information stored in the data storaging part 150 is not limited to those mentioned above, and as mentioned above, any information for optimal process design of the water and wastewater treatment device may be stored in the data storaging part 150.

Figure 3:
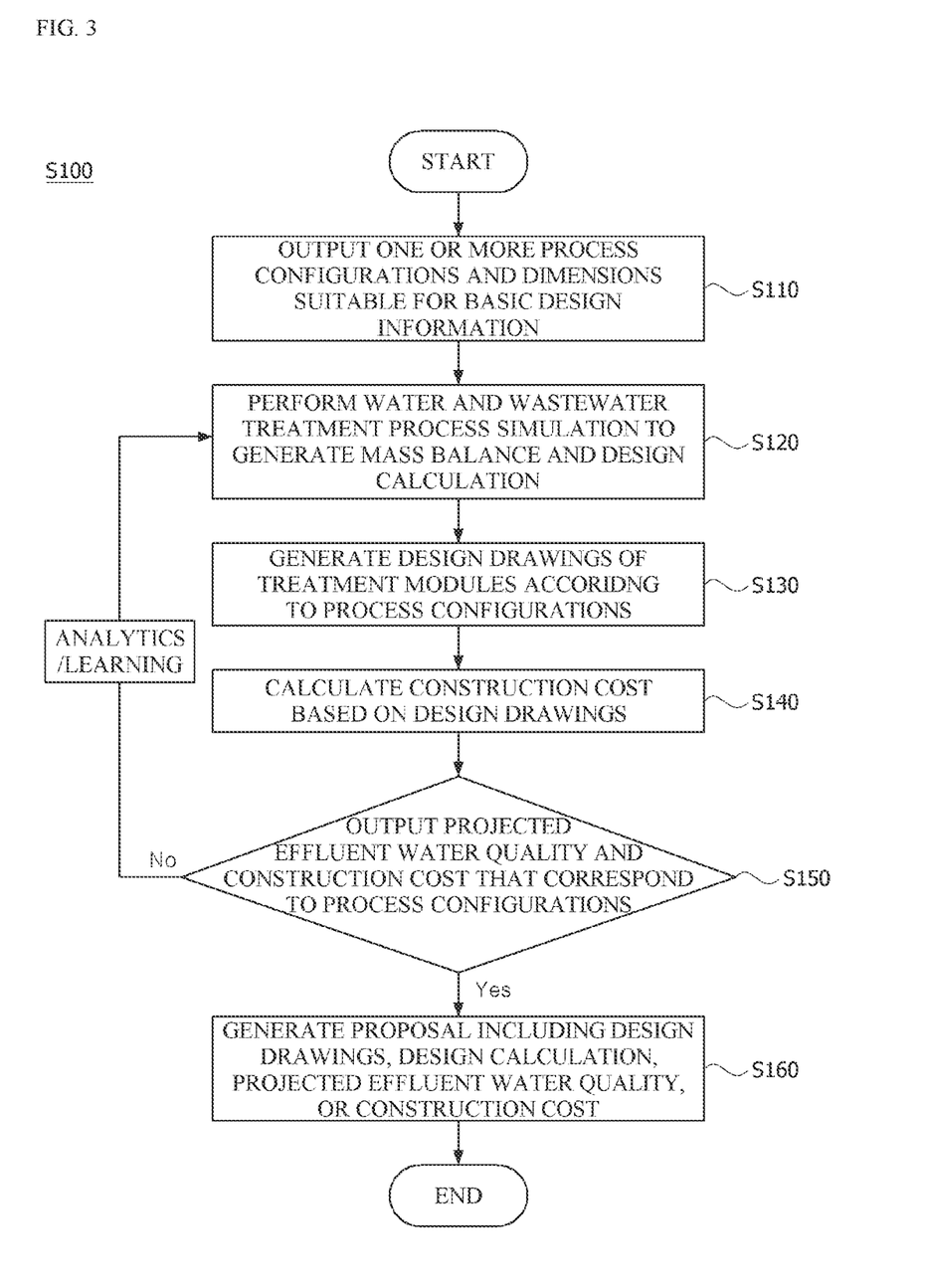
FIG. 3 is a flowchart illustrating a design method using the water and wastewater treatment process optimization and automatic design system illustrated in FIG. 1.

Hereinafter, the design method S100 (hereinafter referred to as "automation method") using the water and wastewater treatment process optimization and automatic design system of the present invention will be described with reference to FIGS. 1 to 4.

the design method S100 includes a simulation performing operation S120, a construction cost calculating operation S140, and a projected effluent water quality and construction cost outputting operation S150.

First, the simulation performing operation S120 includes performing simulation for producing the mass balance and design calculation.

In other words, the simulation performing operation S120 includes producing one or more process configurations 20 and structure dimensions by combinations of the plurality of treatment modules according to the basic design information including the treatment capacity and target water quality of the water and wastewater treatment device.

Also, the simulation performing operation S120 includes performing simulation for producing the mass balance and design calculation based on the generated process configurations 20.

The simulation performing operation S120 is performed through the water and wastewater treatment process simulation part 110 of the automatic design system 10.

Meanwhile, in the design method S100 according to an embodiment of the present invention, prior to performing the simulation performing operation S120, a process configuration and dimension outputting operation S110 is performed.

The process configuration and dimension outputting operation S110 includes deriving one or more process configurations 20 and structure dimensions suitable for basic design information.

The basic design information input in the process configuration and dimension outputting operation S110 relates to basic information of the water and wastewater treatment device, information on the wastewater flowing into the water and wastewater treatment device, and information on the target water quality.

Meanwhile, selecting a process configuration 20 in the process configuration and dimension outputting operation S110 may also be performed by the designer designing the water and wastewater treatment device. For reference, in the process configuration and dimension outputting operation S110, a process configuration 20 may also be selected using a system or program such as a separate computer.

In the process configuration and dimension outputting operation S110, judgement conditions are compared or listed to select a suitable process configuration 20.

For reference, the judgement conditions being compared or listed may be conditions such as the water quality, construction cost, required area, maintenance and administration fee, etc. for each process configuration 20, but are not necessarily limited thereto.

The process configuration and dimension outputting operation S110 is performed through the process drawing part 112 of the automatic design system 10.

Meanwhile, for convenience of description, the process configuration and dimension outputting operation S110 and the simulation performing operation S120 have been separately described.

However, preferably, the process configuration and dimension outputting operation S110 and the simulation performing operation S120 may substantially be performed in a single operation.

Figure 4:
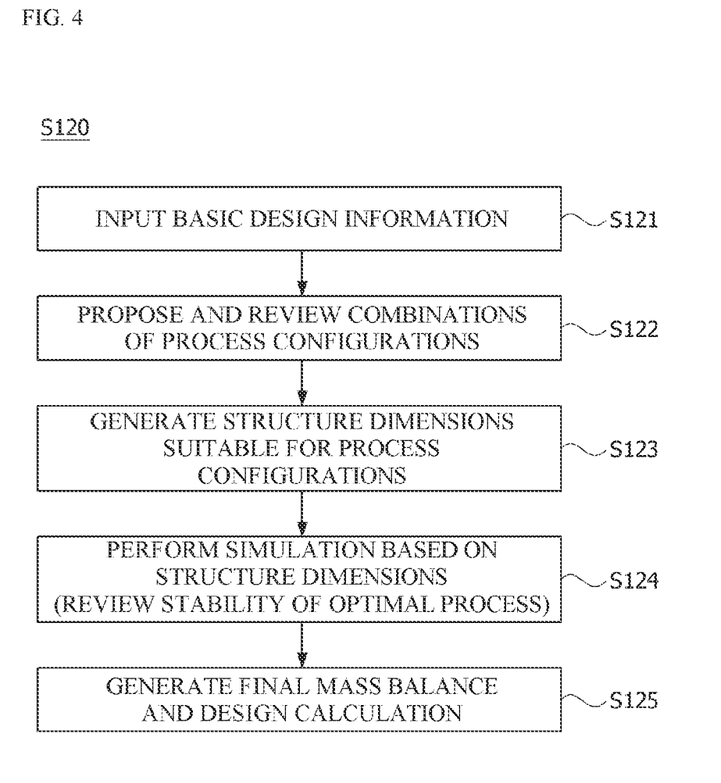
FIG. 4 is a flowchart for describing a simulation performing operation illustrated in FIG. 3.

The process configuration and dimension outputting operation S110 and the simulation performing operation S120 will be defined as the simulation performing operation S120 and described in detail with reference to FIG. 4.

First, in the simulation performing operation S120, basic design information is input (S121). Here, the basic design information includes information such as the treatment capacity and design water quality.

Then, combinations of one or more, preferably, a plurality of, process configurations 20 according to combinations of the plurality of treatment modules are proposed (S122). Here, a review of the proposed combinations of the process configurations 20 may also be performed.

Then, structure dimensions suitable for the corresponding process configuration 20 are generated (S123).

Then, simulation is performed on the basis of the generated structure dimensions (S124).

In other words, on the basis of the generated structure dimensions, dynamic simulation is performed in consideration of changes in amounts or changes in conditions such as high concentration, low concentration, low water temperature, low flow rate, and high flow rate, other than the basic design information.

For reference, in the process of performing the dynamic simulation, the stability of the proposed process configurations 20 may also be reviewed.

Then, the final mass balance and design calculation are generated according to a result of the performed simulation (S125).

The above-described simulation performing operation S120 is performed through the water and wastewater treatment process simulation part 110 of the automatic design system 10.

After the process configuration and dimension outputting operation S110, the water and wastewater treatment process simulation performing operation S120 is performed.

Then, after the simulation performing operation S120, a drawing generating operation S130 is performed.

The drawing generating operation S130 includes generating design drawings of the treatment modules according to the process configurations 20 on the basis of the mass balance and design calculation generated in the simulation performing operation S120.

The drawing generating operation S130 includes primarily generating design drawings for the treatment modules according to the process configurations 20.

Also, the drawing generating operation S130 includes generating detailed design drawings based on the primarily-generated design drawings.

Accordingly, in the drawing generating operation S130, numerical values of the detailed design drawings for design of the process configurations 20, as well as the design drawings of the treatment modules according to the process configurations 20, are generated.

The drawing generating operation S130 is performed through the drawing generating part 122 of the automatic design system 10.

Then, after the design drawings for the process configurations 20 are generated through the drawing generating operation S130, the construction cost calculating operation S140 is performed.

The construction cost calculating operation S140 includes calculating the construction cost according to the design calculation. The construction cost calculated in this case is calculated on the basis of the design drawings generated in the drawing generating operation S130.

The construction cost calculating operation S140 is performed through the construction cost calculating part 120 of the automatic design system 10.

Here, the construction cost calculated in the construction cost calculating operation S140 may include a repair bill, the construction cost & maintenance and administration fee, a civil construction cost, a mechanical construction cost, an electricity/measurement construction cost, a test operation cost, a building construction cost, calculation of the annual maintenance and administration fee, the total LCC, and the like.

Then, after the construction cost according to the design calculation design calculation is calculated through the construction cost calculating operation S140, the projected effluent water quality and construction cost outputting operation S150 is performed.

In the projected effluent water quality and construction cost outputting operation S150, the projected effluent water quality and construction cost that correspond to each process configuration 20 are output.

In particular, in the projected effluent water quality and construction cost outputting operation S150, the design calculation, the projected effluent water quality, and construction cost for the entire process configurations 20 that satisfy the target water quality may also be output.

Also, in the projected effluent water quality and construction cost outputting operation S150, the plurality of process configurations 20 may be output, and the design calculation, projected effluent water quality, and construction cost for each process configuration may also be output.

The projected effluent water quality and construction cost outputting operation S150 is performed through the outputting part 130 of the automatic design system 10.

Meanwhile, in the projected effluent water quality and construction cost outputting operation S150, when the process configuration 20 is determined as not satisfying the target water quality, one or more process configurations 20 are derived again according to the basic design information through the simulation performing operation S120.

Then, in the projected effluent water quality and construction cost outputting operation S150, the projected effluent water quality according to the mass balance and design calculation according to the derived process configurations 20 is generated again.

Here, in order to perform the simulation performing operation S120 again, an analytics/learning technique is used.

On the other hand, in the projected effluent water quality and construction cost outputting operation S150, when the process configuration 20 is determined as satisfying the target water quality, a proposal generating operation S160 is performed.

In the proposal generating operation S160, a design proposal including at least one of the design calculation generated by the simulation performing operation S120, the design drawings generated by the drawing generating operation S130, and the projected effluent water quality and construction cost output by the projected effluent water quality and construction cost outputting operation S150 is generated.

Due to the above configuration, the water and wastewater treatment process optimization and automatic design system 10 and the design method S100 using the same according to an embodiment of the present invention have effects of allowing optimization of water and wastewater treatment processes for design of a water and wastewater treatment device that includes a plurality of treatment processes and allowing automatic production of design deliverables such as drawings, bills of quantities, etc., for design of an optimal process configuration.

Further, by the water and wastewater treatment process optimization and automatic design system 10 and the design method S100 using the same according to an embodiment of the present invention, it is possible to significantly reduce the time and manpower required to design the optimal process of the water and wastewater treatment device and significantly reduce human error in the design deliverables.

Also, the water and wastewater treatment process optimization and automatic design system 10 and the design method S100 using the same according to an embodiment of the present invention allow design of an optimal process configuration in which a plurality of treatment modules, which satisfy target water quality and treatment capacity for the water and wastewater treatment device, are combined.

Embodiments of the present invention have been described above using specific details, such as specific elements, and limited embodiments and drawings, but the embodiments are only provided to help a more general understanding of the present invention, and the present invention is not limited to the embodiments described above, and those of ordinary skill in the art to which the present invention pertains may make various alterations and modifications from the above description. Therefore, the spirit of the present invention should not be defined as being limited to the described embodiments, and not only the claims below but also their equivalents or any equivalent modifications fall within the scope of the spirit of the present invention.

INDUSTRIAL APPLICABILITY

A water and wastewater treatment process optimization and automatic design system related to an embodiment of the present invention can optimize water and wastewater treatment processes for design of a water and wastewater treatment device that includes a plurality of treatment processes and can automatically generate design deliverables such as drawings, bills of quantities, etc., for design of an optimal process configuration.

The invention claimed is:

1. A design method using a system for a water and wastewater treatment process optimization and automatic design, the system comprising:
   a computing device;
   the method comprising:
      using the computing device to perform operations including:
         an operation using the water and wastewater treatment process simulation module configured to derive one or more process configurations in which a plurality of treatment modules are combined according to basic design information including a treatment capacity and design water quality of a water and wastewater treatment device and performing a simulation to generate mass balance and a design calculation based on the derived process configurations;

an operation using the water and wastewater treatment process simulation module configured to derive structure dimensions for each of the plurality of treatment modules of the derived one or more process configurations suitable for the basic design information;

a drawing generating operation using a drawing generating module configured to generate design drawings of the plurality of treatment modules according to the one or more process configurations based on the mass balance and the design calculation generated in the simulation;

an operation using a construction cost calculating module configured to calculate a construction cost according to the design calculation;

an operation using an outputting module configured to output the one or more process configurations, along with the projected effluent water quality, the construction cost, and the design calculation for each output process configuration, and an operation using a proposal generating module configured to generate a design proposal including at least one of the design drawings, the design calculation, the projected effluent water quality, and the construction cost, wherein the structure dimensions derived for each of the plurality of treatment modules is generated according to detailed design information including at least one of wastewater flowing in, major design factors, residence time, and target water quality, wherein the water and wastewater treatment process simulation module:

stores the one or more process configurations in which plurality of treatment modules are combined, reviews the stability of the derived one or more process configurations by performing a simulation through judgment of conditions including one of a water temperature condition, a change in a concentration condition of the wastewater flowing in, and a daily/weekday/weekend or seasonal/annual change in a wastewater inflow condition other than basic design information, and reviews the economic feasibility depending on a treatment capacity and water quality treated through the derived one or more process configurations and iteratively performs a redesigning process by adjusting an input and inflow capacity, and a target water quality of the one or more process configurations according to the reviewed results, thereby selecting corresponding process configurations for the derived one or more process configurations, wherein the proposal generating operation automatically generates a design proposal including at least one of the design calculation generating an optimal treatment process for a water and wastewater treatment device selected by the simulation performing operation, the design drawings are generated by the drawing generating operation, and the construction cost is output by the projected effluent water quality and construction cost outputting operation.

2. The design method of claim 1, wherein the projected effluent water quality and construction cost outputting operation includes repeatedly performing a water and wastewater treatment process simulation performing operation for revising the process configuration according to detailed design information using an analytics/learning technique in a case where the process configuration is determined as not satisfying the target water quality.

* * * * *